United States Patent
Gruenwald et al.

(10) Patent No.: US 10,109,898 B2
(45) Date of Patent: Oct. 23, 2018

(54) COOLING DEVICE, IN PARTICULAR FOR A BATTERY OF A MOTOR VEHICLE

(71) Applicant: Mahle Behr GmbH & Co. KG, Stuttgart (DE)

(72) Inventors: Juergen Gruenwald, Ludwigsburg (DE); Tasnim Benamor, Stuttgart (DE); Dirk Neumeister, Stuttgart (DE); Stefan Hirsch, Stuttgart (DE)

(73) Assignee: Mahle Behr GmbH & Co. KG (DE)

( * ) Notice: Subject to any disclaimer, the term of this patent is extended or adjusted under 35 U.S.C. 154(b) by 655 days.

(21) Appl. No.: 14/620,160

(22) Filed: Feb. 11, 2015

(65) Prior Publication Data

US 2015/0229009 A1 Aug. 13, 2015

(30) Foreign Application Priority Data

Feb. 12, 2014 (DE) .................. 10 2014 202 542

(51) Int. Cl.
| | |
|---|---|
| *H01M 10/625* | (2014.01) |
| *H01M 10/6556* | (2014.01) |
| *H01M 10/6554* | (2014.01) |
| *H01M 10/6572* | (2014.01) |
| *H01M 10/613* | (2014.01) |

(52) U.S. Cl.
CPC ....... *H01M 10/625* (2015.04); *H01M 10/613* (2015.04); *H01M 10/6554* (2015.04); *H01M 10/6556* (2015.04); *H01M 10/6572* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 6,653,002 B1 * | 11/2003 | Parise | .................. B01F 5/0614 136/200 |
| 2011/0052960 A1 | 3/2011 | Kwon et al. | |
| 2012/0107663 A1 | 5/2012 | Burgers et al. | |
| 2012/0156541 A1 * | 6/2012 | Sohn | ................. H01M 10/0525 429/120 |
| 2012/0298340 A1 * | 11/2012 | Al-Otaibi | ................ F28F 13/12 165/109.1 |
| 2013/0316203 A1 | 11/2013 | Hsiao et al. | |
| 2013/0323543 A1 | 12/2013 | Grunwald et al. | |

FOREIGN PATENT DOCUMENTS

| | | |
|---|---|---|
| DE | 102011004721 A1 | 8/2012 |
| DE | 102012218102 A1 | 6/2013 |
| WO | WO-2013/156554 A1 | 10/2013 |

OTHER PUBLICATIONS

German Search Report for DE-102014202542.7.
English abstract for DE-102012218102 (Jun. 6, 2013).

* cited by examiner

*Primary Examiner* — Tamir Ayad
(74) *Attorney, Agent, or Firm* — Fishman Stewart PLLC

(57) ABSTRACT

A cooling device for a battery of a motor vehicle may include a first cooling plate and a second cooling plate bonded to the first cooling plate. The second cooling plate may include at least one depression extending in a direction away from the first cooling plate. The depression may define at least one fluid duct for a coolant flow. A first side of the first cooling plate facing away from the second cooling plate may include at least one thermoelectric element. A first side of the second cooling plate facing towards the first cooling plate may include a plurality of turbulence-generating elements.

20 Claims, 3 Drawing Sheets

COOLING DEVICE, IN PARTICULAR FOR A BATTERY OF A MOTOR VEHICLE

CROSS-REFERENCE TO RELATED APPLICATIONS

This application claims priority to German Patent Application No. 10 2014 202 542.7, filed Feb. 12, 2014, the contents of which are hereby incorporated by reference in their entirety.

TECHNICAL FIELD

The invention relates to a cooling device, in particular for a battery of a motor vehicle. The invention further relates to a battery arrangement with such a cooling device and a motor vehicle with at least one such battery arrangement.

BACKGROUND

In modern hybrid and electric motor vehicles, lithium-ion batteries are often used as rechargeable energy stores. A battery which is optimized with regard to lifespan and maximum energy storage capacity requires a correspondingly efficient cooling system for the individual battery cells, which is able to prevent a heating of the battery beyond a maximum operating temperature.

Against this background, cooling systems are known from the prior art, which permit a heat exchange between the battery and the cooling plates by means of two cooling plates, constructed in the manner of half shells which, in a state fastened to one another, form a coolant duct for a coolant, wherein the evaporation enthalpy necessary for the evaporation of the liquid coolant is withdrawn from the battery in the form of heat. If a solely single-phase coolant, present in only liquid form, is used, the said heat exchange can then be assisted by thermoelectric elements, for instance in the form of so-called Peltier elements, which are arranged at defined locations between the battery which is to be cooled and the cooling plates.

Against this background, EP 1 271 085 A2 concerns a cooling device for cooling a vehicle battery by means of a coolant. The said cooling device comprises a plurality of cooling elements of uniform construction, able to be flowed through by the coolant and able to be brought into abutting contact with the battery which is to be cooled, which cooling elements have a first cooling element side and a second cooling element side lying opposite thereto. The cooling element sides have connection openings, which form inlet or respectively outlet openings for the coolant and are connected in a communicating manner with the interior of the cooling element.

GB 2 063 450 describes a similar cooling device in the form of a plate heat exchanger, in which a plurality of cooling plates are stacked onto one another along a stacking direction. To improve the heat exchange, depressions can be provided in the individual cooling plates.

SUMMARY

It is an object of the present invention to provide an improved embodiment for a cooling device, by means of which in particular a particularly homogeneous cooling of the battery/batteries which is/are to be cooled can be achieved.

This problem is solved by the subject matter of the independent claims. Preferred embodiments are the subject matter of the dependent claims.

Accordingly, the basic idea of the invention is to provide a plurality of turbulence-generating elements in a fluid duct which is formed by two cooling plates, which turbulence-generating elements generate turbulences locally, i.e. turbulent flows in the coolant which is flowing through the fluid duct. By means of such turbulence-generating elements, the heat transition coefficient of the cooling device can be increased locally in the region of the turbulence-generating elements, which leads there to an improved heat flow from the battery which is to be cooled to the coolant.

As the coolant undergoes an increase in temperature on flowing through the cooling plates, due to the heat withdrawn from the battery, which in turn would lead to a reduction of the heat flow from the battery to the coolant owing to the reduced temperature difference between coolant and battery, it is proposed according to the invention to arrange turbulence-generating elements in such a manner along the through-flow direction of the coolant through the fluid duct. In this way, a temperature difference decreasing along the flow direction between coolant and battery which is to be cooled can be equalized, so that as a result the heat flow from the battery to the coolant can be kept constant. Ultimately, this results in an improved cooling of the battery, because it is particularly homogeneous.

A cooling device according to the invention therefore comprises a first cooling plate and a second cooling plate which is fastened to the first cooling plate in a firmly bonded manner. The second cooling plate has a depression here, so that the two cooling plates, in a state fastened to one another, form at least one fluid duct for the coolant in the region of the said depression. On a first side of the first cooling plate, facing away from the second cooling plate, at least one thermoelectric element, for instance in the manner of a Peltier element, is arranged, which assists the heat transport from the battery to the cooling device. However, as already explained, a plurality of turbulence-generating elements which is provided on a first side of the second cooling plate, facing the first cooling plate, is essential to the invention.

Particularly preferably, the turbulence-generating elements can be constructed in sections with regard to their element density and/or their number and/or their diameter such that a heat flow d/dt Q at least between the first cooling plate and the coolant flowing through the fluid duct is substantially constant at least in sections, in particular over the entire first cooling plate. The heat flow d/dt Q is defined here according to the formula d/dt Q=$\alpha$*$\Delta$T, wherein a is the heat transition coefficient and $\Delta$T is the temperature difference between the coolant and the first cooling plate. "Element density" means here the number of turbulence-generating elements per unit area.

In a preferred embodiment, not only one single thermoelectric element is installed in the cooling device. Rather, the possibility presents itself to provide at least two, preferably a plurality of thermoelectric elements which, in a manner known to the specialist in the art, are able to significantly improve the heat exchange between the battery which is to be cooled and the coolant by the supplying of electrical current.

With regard to the structural configuration of the turbulence-generating elements essential to the invention, a variety of options open up for the relevant specialist in the art. An embodiment may be considered to be particularly preferred, in which the turbulence-generating elements are constructed respectively as nub-like elevations which, in particular in the manner of truncated cones, protrude away from the second cooling plate towards the first cooling plate. Experimental investigations and computer simulations have shown that such elevations promote the desired formation of turbulent flows in the coolant to the point of eddy currents to a particular extent. In addition, such elevations are relatively simple to produce, for instance by deep drawing by means of a suitable stamping tool, which results in cost advantages in the production of the entire cooling device.

In an advantageous further development, the nub-like elevations lie respectively against the first cooling plate. In this way, the first cooling plate, carrying the battery which is to be cooled, can rest against the nub-like elevations of the second cooling plate, whereby the structural integrity of the entire cooling device can be improved to a not insignificant extent. A particularly high rigidity of the arrangement of first and second cooling plate can be achieved when the nub-like elevations are fastened to the first cooling plate in a firmly bonded manner, for instance by means of a soldered connection. As the battery cells mounted for cooling on the side of the second cooling plate applied by the first cooling plate can have a considerable own weight, the first cooling plate is therefore able to rest in the region of the elevations not only against the second cooling plate, but is additionally fixed rigidly to the second cooling plate in this region, which distinctly increases the structural integrity of the entire cooling device.

Particularly expediently, the fluid duct can extend along a longitudinal direction extending parallel to a longitudinal side of the cooling plates, so that with regard to the coolant a through-flow direction of the fluid duct is defined substantially by the said longitudinal direction. Alternatively thereto, the cooling device may, however, also be configured structurally such that the fluid duct extends along a transverse direction extending parallel to a transverse side of the cooling plates, so that the through-flow direction is established substantially through this transverse direction.

In a further, preferred embodiment an element density of the turbulence-generating elements increases along the through-flow direction. Computer simulations in this context have shown that with an increasing element density, the intensity of the turbulence effects occurring in the coolant stream increases distinctly. Therefore, with a through-flow of the fluid duct in the through-flow direction such that the coolant firstly flows through regions of the cooling means with a smaller element density, a temperature difference between battery and coolant decreasing on flowing through the fluid duct is equalized by increasing turbulence flows, because the heat transition coefficient likewise increases with increasing element density. As a result, the heat flow density between battery and coolant or respectively cooling plates can be kept largely or even completely constant.

The same advantageous effect can be achieved if, with regard to a top view onto the second cooling plate, a respective diameter of the turbulence-generating elements, constructed as nub-like elevations, decreases along the through-flow direction of the cooling device. For the case where the elevations have a geometric shape in the manner of a truncated cone, so that the diameter thereof narrows from the second cooling plate towards the first cooling plate, the diameter can be calculated for instance by arithmetic averaging of the diameter of the elevation in the region of its upper and lower side.

For the case where the cooling device which is presented here comprises a plurality of thermoelectric elements, i.e. has at least two such elements, it is recommended in a further, preferred embodiment, for cost reasons, not to provide thermoelectric elements in all regions of the first side of the cooling plate, but rather to limit their provision to individual regions or respectively sections. Against the background of such considerations, an advantageous further development proves to be particularly expedient in which at least a first plate section is provided along the through-flow direction of the cooling device, in which on the first side of the first cooling plate at least one thermoelectric element is arranged. Additionally, on the other hand, at least one further second plate section is provided, in which no thermoelectric elements are arranged on the said first side of the first cooling plate.

Particularly preferably, at least two first plate sections and at least two section plate sections can be provided alternately along the through-flow direction of the cooling device along a longitudinal side of the first cooling plate. In this case, the coolant will therefore flow through the at least two first plate sections and the at least two second plate sections in succession and alternately.

Particularly preferably, turbulence-generating elements are provided in the cooling device at least in a first plate section for generating a region which is turbulent in sections in the coolant flow field. In this way, the heat transition coefficient of the cooling device can be increased in the region of the thermoelectric elements in which heat is to be transferred from the battery to the coolant to a particularly pronounced extent, so that the heat flow density from the battery to the coolant is likewise increased there.

Particularly low production costs can be achieved, however, if turbulence-generating elements are provided along the through-flow direction only in the first plate section, but not in the second plate section, in which no thermoelectric elements are present for increasing the heat exchange between battery and cooling plates.

Particularly pronounced turbulence effects are brought about here in the coolant flowing through the fluid duct if the turbulence-generating elements, with respect to a top view onto the second cooling plate, are arranged in a grid-like manner thereon. Such a grid-like arrangement of the turbulence-generating elements, if these are configured in the form of already mentioned elevations, furthermore assists the already mentioned stable supporting of the first cooling plate on the second cooling plate.

In an alternative variant to the previously explained embodiments with plate sections on which turbulence-generating elements are only provided in sections, turbulence-generating elements can, however, also be distributed substantially completely over the entire first side of the second cooling plate.

A mechanically particularly stable arrangement of the two cooling plates can be achieved if the second cooling plate, in the region at least of one elevation, preferably of all elevations, is connected with the first cooling plate in a firmly bonded manner, in particular by means of soldering.

To achieve a particularly homogeneous cooling efficiency through the cooling device which is presented here, in a preferred embodiment it is proposed to arrange a heat distribution plate on the first side of the first cooling plate, and namely such that the plurality of thermoelectric elements is arranged in a sandwich-like manner between the first cooling plate and the heat distribution plate. In this way, it can be achieved that the thermo-electric elements develop their cooling effect on the battery not only in a locally limited manner, which would counteract the homogeneous cooling efficiency which is aimed for. At the same time, with the use of such a heat distribution plate, the number of thermoelectric elements required as a whole in the cooling device can be reduced compared with cooling devices without such a distribution plate, which has a favourable effect on the production costs of the cooling device.

However, an embodiment in which the first cooling plate is configured so as to be substantially flat is able to be produced particularly simply and therefore economically with regard to manufacture.

In a preferred embodiment, not only one single thermoelectric element is installed in the cooling device. Rather, the possibility presents itself to provide at least two, preferably a plurality of thermoelectric elements, which are able to significantly improve the heat exchange between the battery which is to be cooled and the coolant in a manner known to the specialist in the art by supplying of electrical current.

With regard to the structural configuration of the turbulence-generating elements essential to the invention, a variety of options open up for the relevant specialist in the art. An embodiment may be considered as particularly preferred in which the turbulence-generating elements are constructed respectively as nub-like elevations which, in particular in the manner of truncated cones, protrude away from the second cooling plate towards the first cooling plate. Experimental investigations and computer simulations have shown that such elevations promote the desired formation of turbulent flows in the coolant to the point of eddy currents to a particular extent. In addition, such elevations are relatively simple to produce, for instance by deep drawing means of a suitable stamping tool, which results in cost advantages in the production of the entire cooling device.

In an advantageous further development, the nub-like elevations lie respectively against the first cooling plate. In this way, the first cooling plate, carrying the battery which is to be cooled, can rest against the nub-like elevations of the second cooling plate, whereby the structural integrity of the entire cooling device can be improved to a not insignificant extent. A particularly high rigidity of the arrangement of first and second cooling plate can be achieved when the nub-like elevations are fastened to the first cooling plate in a firmly bonded manner, for instance by means of a soldered connection. As the battery cells mounted for cooling on the side of the second cooling plate applied by the first cooling plate can have a considerable own weight, the first cooling plate is therefore able to rest in the region of the elevations not only against the second cooling plate, but is additionally fixed rigidly to the second cooling plate in this region, which distinctly increases the structural integrity of the entire cooling device.

The invention further relates to a battery arrangement with a battery, in particular with a lithium-ion battery, and with a cooling device with one or more of the previously mentioned features. The battery is coupled thermally here with the cooling device.

Finally, the invention relates to a motor vehicle with at least one previously mentioned battery arrangement.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
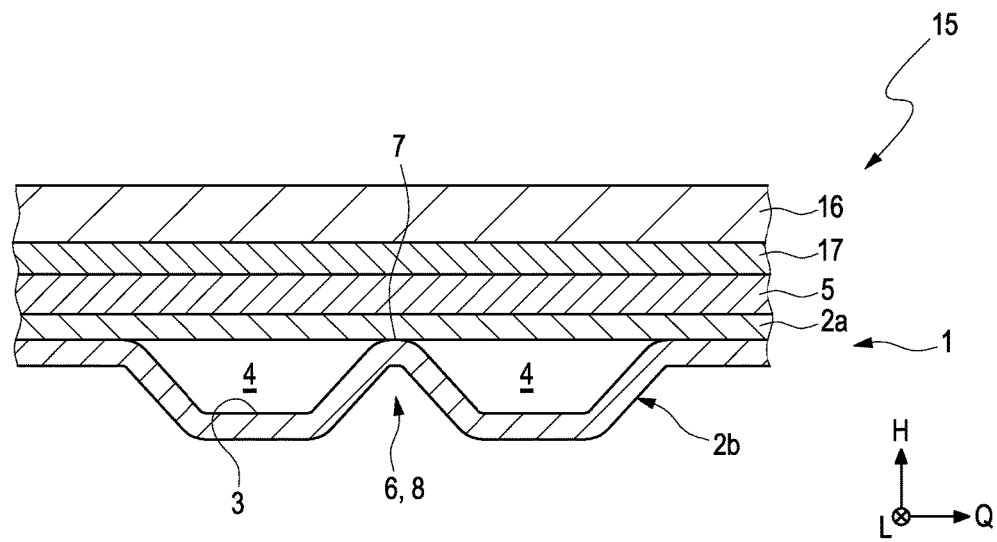
FIG. 1 a first example of a cooling device according to the invention in a cross-section, FIG. 2 an illustration in the manner of a schematic diagram of the cooling device of FIG. 1, FIG. 3 a first variant of the example of FIG. 2, FIG. 4 a second variant of the example of FIG. 2, FIG. 5 a third variant of the example of FIG. 2.

FIG. 1 illustrates an example of a battery arrangement 15 according to the invention in part and in a cross-section. The battery arrangement 15 comprises a cooling device 1 according to the invention with a first cooling plate 2a and with a second cooling plate 2b, fastened to the first cooling plate 2a in a firmly bonded manner. The second cooling plate 2b has a depression 3, so that the two cooling plates 2a, 2b, in a state fastened to one another, form in the region of the depression 3 a fluid duct 4 for a coolant. The fluid duct 4 extends along a longitudinal direction L of the two cooling plates 2a, 2b, which in the example of FIG. 1 runs in an orthogonal direction to the plane of the drawing. On a first side of the first cooling plate 2a, facing away from the second cooling plate 2b, a plurality of thermoelectric elements 5 is arranged, of which only a single element 5 is shown by way of example in FIG. 1.

The battery arrangement 15 further comprises a battery 16, for example a lithium-ion battery, which is coupled thermally with the first cooling plate 2a via a heat distribution plate 17. The thermoelectric elements 5 are arranged here in a sandwich-like manner between the first cooling plate 2a and the heat distribution plate 17. In other words, the second cooling plate 2b, the first cooling plate 2a, the thermoelectric elements 5 and the heat distribution plate 17 are stacked on one another along a vertical direction H of the cooling device 1.

The thermoelectric elements 5 can be arranged at a distance from one another with respect to the longitudinal direction L and also with respect to a transverse direction Q, which runs orthogonally both to the vertical direction H and also to the longitudinal direction L. Electrical connecting lines (not shown) for the electric current supply of the thermoelectric elements 5 may be mounted in intermediate spaces between the individual elements 5.

A plurality of turbulence-generating elements 6, only a single one of which is shown in FIG. 1 for the sake of clarity, is provided on a first side of the second cooling plate 2b facing the first cooling plate 2a.

The turbulence-generating elements 6 are respectively constructed as nub-like elevations 8, which protrude in the manner of truncated cones from the second cooling plate 2b towards the first cooling plate 2a. The nub-like elevations 8 are formed integrally on the second cooling plate 2b, for instance by deep drawing or by another suitable forming process. The nub-like elevations 8 have a contact section 7—for the case of a construction in the manner of a truncated cone, this is the top surface of the truncated cone—, with which they lie respectively against the first cooling plate 2a. The elevations 8 can be fastened additionally by means of the contact section 7 in a firmly bonded manner, for example by means of a soldered connection, on the first cooling plate 2a.

Figure 2:
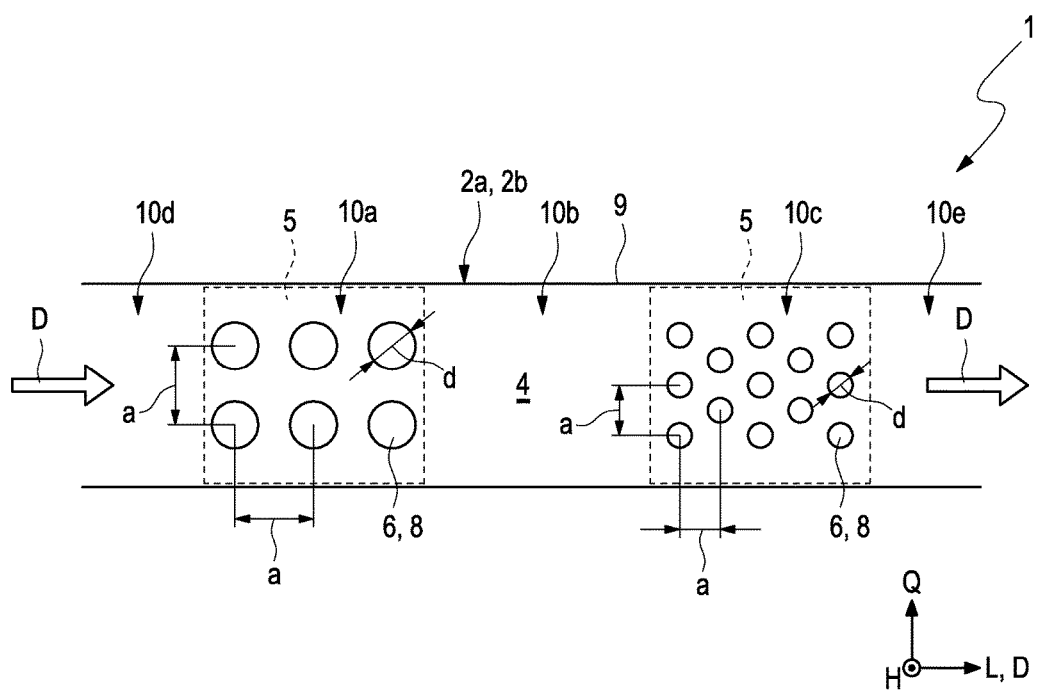

FIG. 2 illustrates now in the manner of a schematic diagram a possible arrangement geometry of the turbulence-generating elements 6 on the second cooling plate 2b of the cooling device 1. In the example of FIG. 2, the fluid duct 4 extends along a longitudinal direction L running parallel to a longitudinal side 9 of the cooling plates 2a, 2b, so that a through-flow direction D of the coolant 4 is defined substantially by the longitudinal direction L.

In the example of FIG. 2, a first plate section is provided along the through-flow direction D of the cooling device 1, in which thermoelectric elements 5 are arranged on the first side of the first cooling plate 2a. This plate section is marked in dashed lines in FIG. 2 and is designated by reference number 10a. A further such (first) plate section is provided downstream of the first plate section 10a and designated by the reference number 10c. Thermoelectric elements 5 are also arranged on the first cooling plate 2a in the region 10c. On the other hand, no thermoelectric elements 5 are provided in the region between the plate sections 10a and 10c, designated hereinbelow as second plate section 10b. The first plate sections 10a and 10c therefore differ from the second plate section 10b at least in that in the second plate section 10b—in contrast to the plate sections 10a, 10c—no thermoelectric elements 5 are provided. In further variants of the example, a plurality of such first and second plate sections 10a, 10c, 10b can alternate along the through-flow direction D of the fluid duct 4. According to the nomenclature presented here, the plate section 10d upstream of the first plate section 10a and the plate section 10e downstream of the first plate section 10e therefore concern respectively a second plate section without turbulence-generating elements 6.

It can be seen from the example of FIG. 2 that the turbulence-generating elements 6 essential to the invention are also provided only in the region of the first plate sections 10a, 10b, but not in the second plate sections 10b, 10d, 10e. This means that turbulences are generated in the coolant in particular in the region of the fluid duct 4 in which, owing to the presence of thermoelectric elements 5, a particularly intensive heat exchange takes place between the battery 16 and the coolant. The turbulence-generating elements 6 can be arranged here, as shown in FIG. 2, with respect to a top view onto the second cooling plate 2b, in a grid-like manner thereon.

It proves to be advantageous to provide the turbulence-generating elements 6 on the second cooling plate 2b such that an element density of the turbulence-generating elements 6 increases along the through-flow direction D of the fluid duct 4. This means that the number of turbulence-generating elements 6 increases per unit area of the second cooling plate 2b along the through-flow direction D. In the example of FIG. 2, the element density is greater in the region of the first plate section 10c than in the region of the first plate section 10a arranged upstream thereof. The increase of the element density takes place in the example of FIG. 1 discontinuously from plate section 10a to plate section 10c and is respectively constant within a plate section 10a, 10c. Typically, the element density of the turbulence-generating elements 6 in the plate section 10c may be 1.5 to 2.7 times the element density in the plate section 10a.

From the example scenario of FIG. 2, it also follows that with respect to the top view onto the second cooling plate 2b a respective diameter d of the elevations 8 decreases along the through-flow direction D. The diameter d of the elevations 8 in the first plate section 10a can be between 8 mm and 10 mm for example, whereas the diameter d of the elevations 8 in the plate section 10c assumes values between 3 mm and 5 mm.

The same can apply for a distance a of two adjacent elevations 6, 8, when this is measured along the longitudinal direction L or the transverse direction Q, running orthogonally to the longitudinal direction L, of the cooling plates 2a, 2b. The decrease of the diameter d or respectively of the distance a takes place in the example of FIG. 2 from the (first) plate section 10a to the (first) plate section 10c in discontinuous form. The previously presented provisions, i.e. an increasing element density along the through-flow direction D, a decreasing distance a and a decreasing diameter d between two adjacent turbulence-generating elements 6, together all lead to the effect of an increased heat transition coefficient α along the through-flow direction D, so that the already discussed decrease of the temperature difference between coolant and battery 16 can be equalized and the heat flow between battery 16 and coolant can be kept almost or even completely constant.

Figure 3:
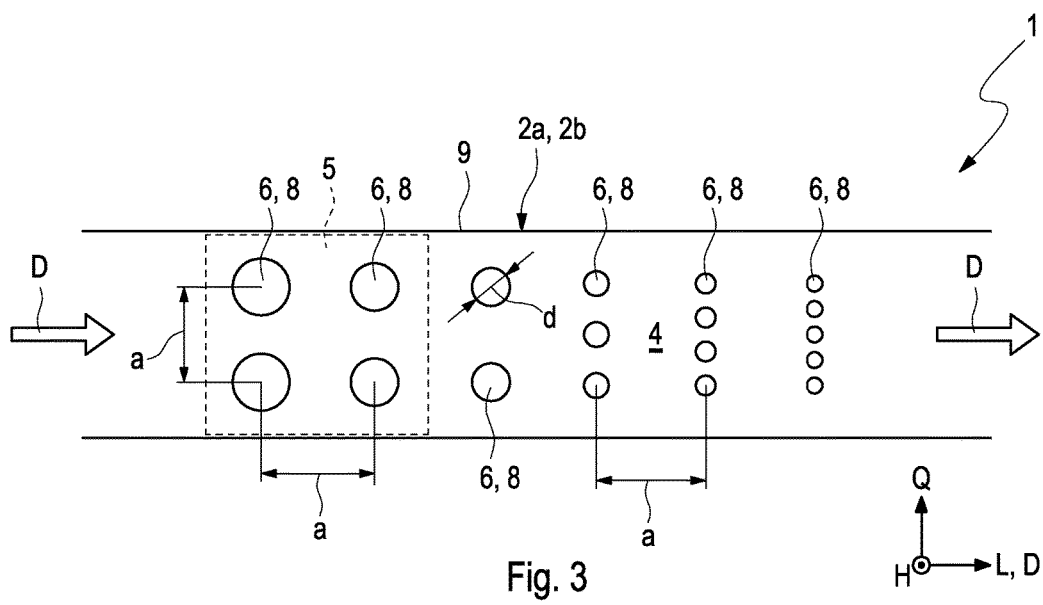

In a variant achieving the same effect, however, a structural configuration of the turbulence-generating elements 6 is possible such that the distance a and/or the diameter d along the through-flow direction D does not decrease discontinuously, but continuously, i.e. constantly. Such a scenario is sketched in a rough diagrammatic manner in FIG. 3: In the scenario of FIG. 3, the turbulence-generating elements 6 are distributed completely over the second cooling plate 2b. This means that no discrete plate sections are provided, in which turbulence-generating elements 6 are provided exclusively, and which alternate along the through-flow direction D with plate sections which are free of turbulence-generating elements 6, as is illustrated in FIG. 2. In the example of FIG. 3, the provision of turbulence-generating elements 6 also takes place independently of the positioning of thermoelectric elements 5, the positions of which are indicated in FIG. 3 in a rough diagrammatic manner by a dashed line. In the example of FIG. 3, the element density of the turbulence-generating elements 6 (number/unit area), just as in the example of FIG. 2, increases along the through-flow direction. In variants of the example of FIG. 3, of course only individual provisions out of those proposed above can be applied.

It is basically the case that the turbulence-generating elements 6 can be constructed with regard to their density and/or their number and/or their diameter in sections such that the heat flow d/dt Q is substantially constant at least between the first cooling plate and the coolant flowing through the fluid duct at least in sections, in particular over the entire first cooling plate. The heat flow d/dt Q is defined here according to the formula $d/dt\, Q = \alpha \ast \Delta T$, wherein a is the heat transition coefficient and $\Delta T$ is the temperature difference between the coolant and the first cooling plate.

In particular the marginal region of the second cooling plate 2b, defined with respect to the transverse direction Q, can be provided with an increased density of turbulence-generating elements 6, in order to also ensure a constant heat flow density d/dt Q in the said marginal region relative to the remaining regions of the cooling plate 2b.

Figure 4:
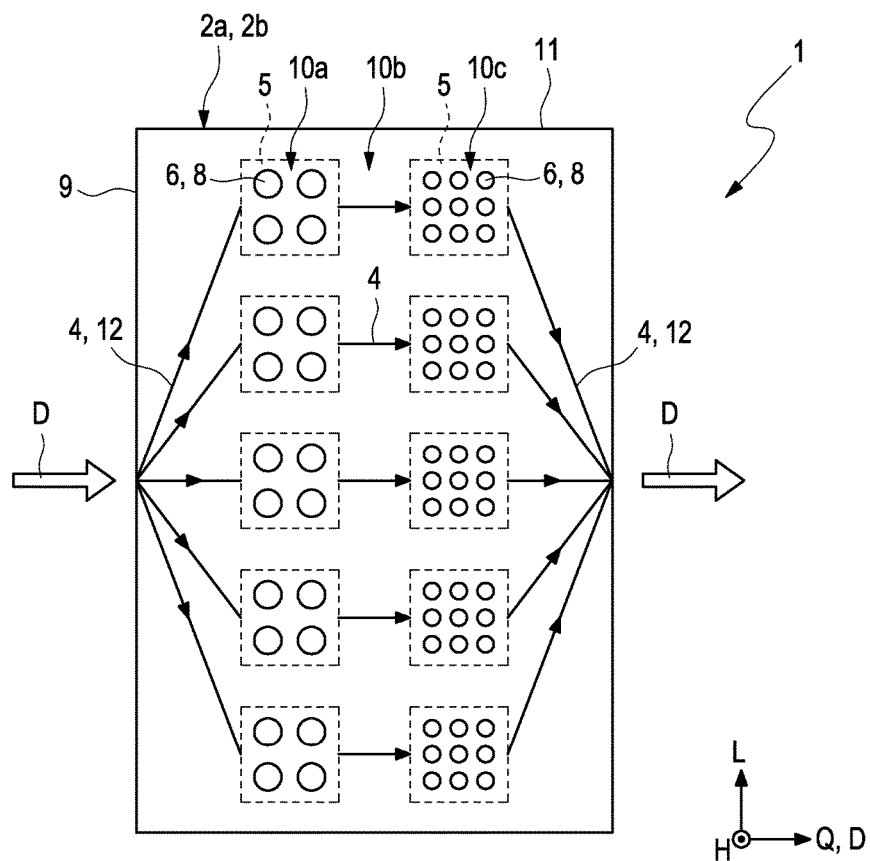

FIG. 4 shows in the manner of a schematic diagram a further example in which the through-flow direction D of several fluid ducts 4 (illustrated only diagrammatically in FIG. 4 in the form of an arrow) extends respectively substantially along the transverse direction Q of the cooling plates 2a, 2b, i.e. parallel to the transverse side 11 thereof.

In such a scenario, the cooling plates 2a, 2b of the cooling device 1 comprise a shared inlet- and outlet region, by means of which the coolant can be distributed to the individual fluid ducts 4 or respectively collected therefrom again. In the inlet- or respectively outlet region—in FIG. 4 designated respectively by the reference number 12—the fluid ducts 4 therefore do not extend along the said transverse direction, but in an oblique direction with respect to the longitudinal and transverse direction L, Q.

In further variants, the features explained with the aid of the examples of FIGS. 2 to 4 can also be combined with one another. For example, the element density of the turbulence-generating elements 6 can also increase continuously or discontinuously—i.e. in sections—in the fluid ducts of FIG. 4. The considerations with regard to the decrease of the diameter d of the elevations 8 and of the distance a of adjacent elevations 8 are able to be applied directly to the scenario of FIG. 4.

Figure 5:
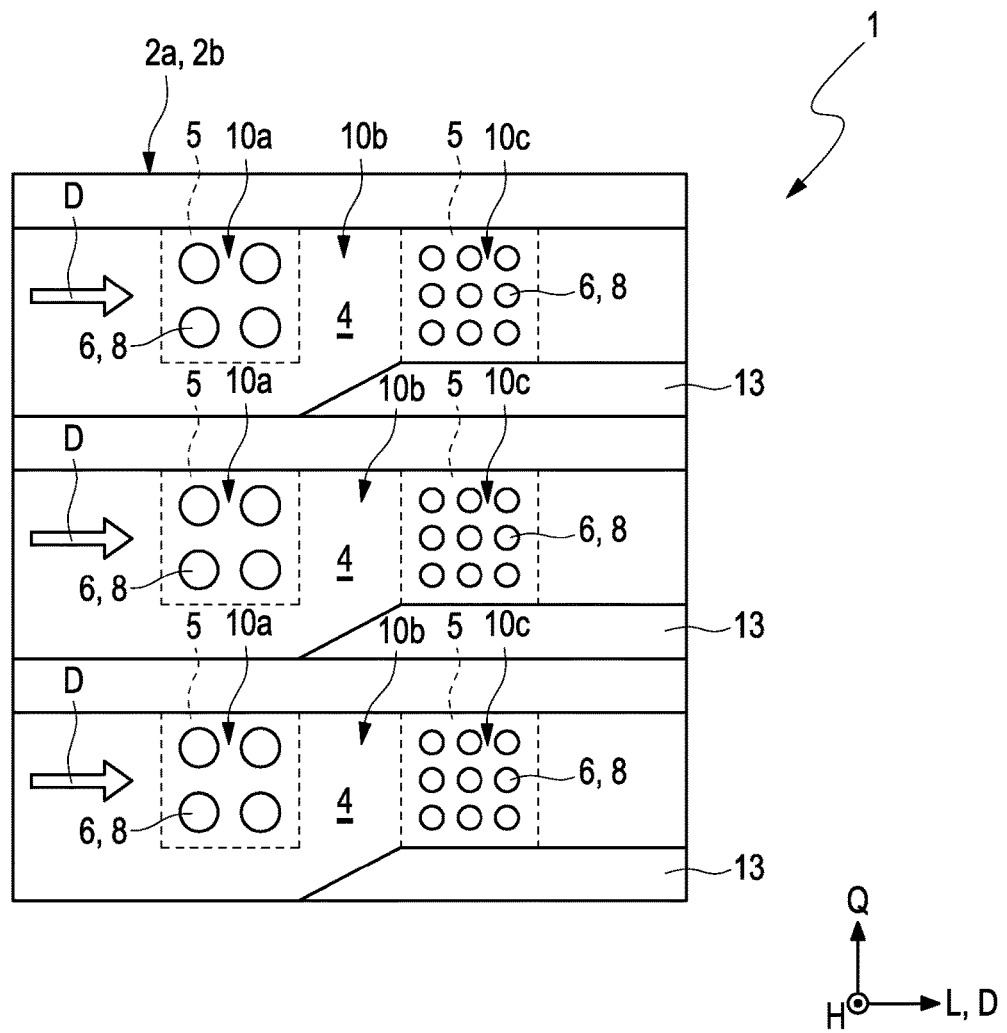

Finally, FIG. 5 shows a variant which can be combined with each of the examples of FIGS. 2 to 4, and in which three fluid ducts 4 run parallel to one another along the longitudinal direction L of the cooling plates 2a, 2b. In each fluid duct 4 a flow barrier 13, for instance in the form of a deflection element, is provided, which provides for a local reduction of the flow cross-section of the respective fluid duct 4 and therefore for an advantageous acceleration—with regard to the achieved heat transition coefficient α—of the coolant in a region of reduced temperature difference between coolant and battery 16 which is to be cooled.

The invention claimed is:

1. A cooling device, comprising:
a first cooling plate;
a second cooling plate bonded to the first cooling plate;
the second cooling plate including at least one depression extending in a direction away from the first cooling plate;
wherein the first cooling plate includes a first side facing away from the second cooling plate and a second side facing the second cooling plate, wherein the first side of the first cooling plate includes at least one thermoelectric element;
wherein a first side of the second cooling plate faces toward the first cooling plate and includes a plurality of turbulence-generating elements; and
wherein at least a portion of the second side of the first cooling plate and at least a portion of the first side of the second cooling plate define at least one fluid duct for communicating a coolant flow in a through-flow direction, and wherein the plurality of turbulence-generating elements define nub-like elevations having a truncated cone shape protruding transversely in the at least one fluid duct from the second cooling plate to the second side of the first cooling plate such that the plurality of turbulence-generating elements contact and lie against the first cooling plate.

2. The cooling device according to claim 1, wherein the plurality of turbulence-generating elements define a plurality of sections with regard to at least one of an element density of the plurality of turbulence-generating elements, a number of the plurality of turbulence-generating elements and a diameter of the plurality of turbulence-generating elements such that at least in the plurality of sections a heat flow is substantially constant at least between the first cooling plate and the coolant flowing through the fluid duct.

3. The cooling device according to claim 1, wherein at least one of:
the fluid duct extends along a longitudinal direction running parallel to a longitudinal side of at least one of the first cooling plate and the second cooling plate, wherein the through-flow direction of the fluid duct is defined substantially by the longitudinal direction, and
the fluid duct extends at least in sections along a transverse direction running parallel to a transverse side of at least one of the first cooling plate and the second cooling plate, wherein the through-flow direction is defined substantially by the transverse direction.

4. The cooling device according to claim 1, wherein an element density of the plurality of turbulence-generating elements increases along the through-flow direction.

5. The cooling device according to claim 1, wherein:
with respect to an elevated view onto the second cooling plate, a respective diameter of the nub-like elevations decreases along the through-flow direction.

6. The cooling device according to claim 1, further comprising at least one first plate section disposed along the through-flow direction, wherein the first side of the first cooling plate includes the at least one thermoelectric element, and
at least one second plate section disposed along the through-flow direction, in which no thermoelectric elements are arranged on the first side of the first cooling plate.

7. The cooling device according to claim 6, wherein at least two first plate sections and at least two second plate sections are arranged along the through-flow direction, wherein the at least two first plate sections are positioned to alternate with the at least two second plate sections.

8. The cooling device according to claim 6, wherein the plurality of turbulence-generating elements are disposed at least in the at least one first plate section.

9. The cooling device according to claim 6, wherein the plurality of turbulence-generating elements are disposed only in the at least one first plate section, but not in the at least one second plate section.

10. The cooling device according to claim 1, wherein the plurality of turbulence-generating elements are arranged, with respect to an elevated view onto the second cooling plate, in a grid-like manner on the second cooling plate.

11. The cooling device according to claim 1, wherein the plurality of the turbulence-generating elements are distributed substantially completely over the entire first side of the second cooling plate.

12. The cooling device according to claim 1, wherein the second cooling plate is soldered in a region of the plurality of turbulence-generating elements with the first cooling plate.

13. The cooling device according to claim 1, further comprising a heat distribution plate adjacent the first side of the first cooling plate, and wherein a plurality of thermoelectric elements are arranged in a sandwich-like manner between the first cooling plate and the heat distribution plate.

14. A battery arrangement, comprising:
a battery;
a cooling device thermally coupled to the battery, wherein the cooling device includes:
a first cooling plate bonded to a second cooling plate, the second cooling plate including at least one depression extending in a direction away from the first cooling plate;
the first cooling plate having a first side facing away from the second cooling plate and a second side facing the second cooling plate, the first side of the first cooling plate including at least one thermoelectric element;

the second cooling plate having a first side facing towards the first cooling plate, the first side of the second cooling plate including a plurality of turbulence-generating elements;

wherein at least a portion of the second side of the first cooling plate and at least a portion of the first side of the first cooling plate define at least one fluid duct for communicating a coolant flow in a through-flow direction, and wherein the plurality of turbulence-generating elements define nub-like elevations having a truncated cone shape protruding transversely in the at least one fluid duct from the second cooling plate to the second side of the first cooling plate such that the plurality of turbulence-generating elements contact and lie against the first cooling plate; and wherein the plurality of turbulence-generating elements include an element density increasing along the through-flow direction.

15. A motor vehicle, comprising:

at least one lithium-ion battery thermally coupled to a cooling device, the cooling device including:

a first cooling plate bonded to a second cooling plate, the second cooling plate including at least one depression extending in a direction away from the first cooling plate;

wherein the first cooling plate has a first side facing away from the second cooling plate and a second side facing the second cooling plate, the first side of the first cooling plate including at least one thermoelectric element;

wherein the second cooling plate has a first side facing towards the first cooling plate, the first side of the second cooling plate including a plurality of turbulence-generating elements; and wherein at least a portion of the second side of the first cooling plate and at least a portion of the first side of the second cooling plate define at least one fluid duct for communicating a coolant flow in a through-flow direction, and wherein the plurality of turbulence-generating elements define nub-like elevations having a truncated cone shape protruding transversely in the at least one fluid duct from the second cooling plate to the second side of the first cooling plate such that the plurality of turbulence-generating elements contact and lie against the first cooling plate.

16. The motor vehicle according to claim 15, wherein the at least one fluid duct extends along a longitudinal direction running parallel to a longitudinal side of at least one of the first cooling plate and the second cooling plate, and wherein a through-flow direction is defined substantially by the longitudinal direction.

17. The motor vehicle according to claim 16, further comprising:

at least one first plate section disposed along the through-flow direction, wherein the first side of the first cooling plate includes the at least one thermoelectric element; and at least one second plate section disposed along the through-flow direction, wherein the first side of the first cooling plate is free of thermoelectric elements in a region of the at least one second plate section.

18. The motor vehicle according to claim 17, wherein at least two first plate sections and at least two second plate sections are arranged along the through-flow direction, wherein the at least two first plate sections are positioned to alternate with the at least two second plate sections.

19. The battery arrangement according to claim 14, wherein at least one of:

a respective diameter of the plurality of turbulence-generating elements decreases along the through-flow direction; and a distance between two adjacent turbulence-generating elements of the plurality of turbulence-generating elements decreases along the through-flow direction.

20. The cooling device according to claim 1, wherein the plurality of turbulence-generating elements define a distance between two adjacent turbulence-generating elements that decreases along the through-flow direction.

\* \* \* \* \*